United States Patent
Boone

(10) Patent No.: US 8,873,168 B2
(45) Date of Patent: Oct. 28, 2014

(54) SYSTEM AND METHOD OF SOLAR FLUX CONCENTRATION FOR ORBITAL DEBRIS REMEDIATION

(75) Inventor: Bradley G. Boone, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 314 days.

(21) Appl. No.: 13/330,602

(22) Filed: Dec. 19, 2011

(65) Prior Publication Data

US 2012/0261514 A1 Oct. 18, 2012

Related U.S. Application Data

(60) Provisional application No. 61/424,204, filed on Dec. 17, 2010.

(51) Int. Cl.
| | | |
|---|---|---|
| B64G 1/52 | (2006.01) | |
| B64G 1/44 | (2006.01) | |
| F24J 2/08 | (2006.01) | |
| B64G 1/22 | (2006.01) | |
| G02B 3/08 | (2006.01) | |

(52) U.S. Cl.
CPC .. B64G 1/52 (2013.01); B64G 1/44 (2013.01); F24J 2/085 (2013.01); B64G 1/222 (2013.01); G02B 3/08 (2013.01)
USPC ............ 359/742; 244/172.8; 244/172.6; 244/159.5

(58) Field of Classification Search
CPC .............................. G02B 23/2492; F24J 2/085
USPC .................. 359/503, 742; 244/172.8, 172.7
See application file for complete search history.

(56) References Cited

U.S. PATENT DOCUMENTS

| | | | |
|---|---|---|---|
| 3,326,624 A | | 6/1967 | Von Maydell et al. |
| 4,305,555 A | | 12/1981 | Davis |
| 5,089,055 A | | 2/1992 | Nakamura |
| 5,120,008 A | | 6/1992 | Ramohalli |
| 5,421,540 A | | 6/1995 | Ting |
| 5,818,395 A | * | 10/1998 | Wolcott et al. ............... 343/753 |

(Continued)

FOREIGN PATENT DOCUMENTS

CN 101726838 * 6/2010 ............. G02B 13/18

OTHER PUBLICATIONS

Baron et al. "Twenty meter space telescope based on diffractive Fresnel lens," Jan. 30, 2004, Proc. SPIE 5166, UV/Optical/IR Space Telescopes: Innovative Technologies and Concepts, vol. 5166, pp. 148-156.*

(Continued)

*Primary Examiner* — Thomas K Pham
*Assistant Examiner* — Marin Pichler
(74) *Attorney, Agent, or Firm* — Noah J. Hayward

(57) ABSTRACT

A system for concentrating solar radiation onto a space debris object to vaporize includes a focusing system, an object tracking system and a positioning system. The focusing system has a total focal length $f_T$, and includes a first focusing device and a second focusing device. The first focusing devices change from a compact state to a deployed state, and the compact surface area is less than the deployed surface area. The object tracking system determines the location of the object. The positioning system orients the focusing system such that solar radiation focuses on the space debris object.

14 Claims, 5 Drawing Sheets

(56) References Cited

U.S. PATENT DOCUMENTS

| | | | |
|---|---|---|---|
| 6,075,200 A | | 6/2000 | O'Neill |
| 6,111,190 A | | 8/2000 | O'Neill |
| 6,150,995 A | * | 11/2000 | Gilger .......................... 343/915 |
| 2008/0111031 A1 | | 5/2008 | Mobrem |

OTHER PUBLICATIONS

Tullson et al. "Broadband antihole photon sieve telescope," Jun. 20, 2007, Applied Optics, vol. 46, Issue 18, pp. 3706-3708.*

Lo et al. "Architectures for space astronomical telescopes using Fresnel optics," Jun. 14, 2006, Proc. SPIE 6265, Space Telescopes and Instrumentation I: Optical, Infrared, and Millimeter, 626522 1-15.*

G. Andersen "Photon Sieve Telescope", Aug. 31, 2005, Proc. SPIE 5899, UV/Optical/IR Space Telescopes: Innovative Technologies and Concepts II, 58990T.*

Cao et al. "Broad-spectrum optical imaging system for large-caliber photon sieve space telescope, has positive lens tightly leaned on harmonic diffraction lens, and photoelectric detector positioned on rear focusing plane of harmonic diffraction lens," CN 101726838, Jun. 9, 2010, english abstract, Derwent 2010-H43322.*

* cited by examiner

SYSTEM AND METHOD OF SOLAR FLUX CONCENTRATION FOR ORBITAL DEBRIS REMEDIATION

CROSS-REFERENCE TO RELATED APPLICATION

This application claims priority to and the benefit of prior-filed co-pending U.S. Provisional Application No. 61/424,204, filed Dec. 17, 2010, the content of which is herein incorporated by reference in its entirety.

STATEMENT OF GOVERNMENTAL INTEREST

This invention was made with government support under contract number HR0011-06-D-0003 awarded by the Defense Advanced Research Projects Agency (DARPA). The government has certain rights in the invention.

BACKGROUND OF THE INVENTION

1. Field of the Invention

The present invention relates to solar technologies, and more particularly to solar concentrators.

2. Description of the Related Art

Space debris includes man-made non-functional objects that are either in Earth orbit or re-entering the atmosphere. Some examples of space debris include non-functional satellites and fragments from space vehicle explosions or collisions. Space debris is a hazard to future space vehicles because of the risk of collision.

Space debris can be separated into three categories by size: Category 1 (<1 cm); Category 2 (1-10 cm); Category 3 (>10 cm). In particular, there are about 100,000 to 10,000,000 pieces of Category 2 space debris within 1600 km of the Earth's surface. Thus, it is important to remediate the large population of Category 2 space debris to reduce the chance of collision.

High power lasers that either deployed on the ground or from space have been proposed as solutions to remediate Category 2 space debris objects. Earth-based lasers suffer huge propagation losses from atmospheric attenuation and turbulence, cloud obscuration, and pointing errors over the longer distances required to intercept debris. To compensate for the huge propagation losses, prohibitively high transmitter flux is required, making power requirements for ground lasers excessive and costly. The relatively low wall-plug efficiency of current laser technology makes space deployment very costly and virtually impractical relative to the launch costs, which place a severe limit on the size, weight and power (SWaP) of effective laser platforms.

Solar flux concentration has been proposed as a way to remediate Category 2 space debris. Solar flux concentration utilizes focused solar radiation to vaporize the space debris. In order to use solar flux concentration, a large area focusing system for concentrating sufficient solar radiation must be carried into space. Ordinarily, a typical focusing system has a lot of large and heavy optical components needed to enable high quality imaging, but solar flux concentration has less demanding requirements on surface curvature, especially using different technology (such as diffractive membrane optics), and the mass and bulk of conventional optical components make it impractical for spacecraft deployment of such large apertures.

What is needed for effective space debris remediation is a solar flux concentration system that that has a compact volume for easy transportation to space, yet provides a large surface area after deployment that is easily managed and directed.

SUMMARY OF THE INVENTION

The present invention provides an effective system implementation that has a compact volume for easy transportation to space, yet provides a large surface area after deployment, and requires a less demanding pointing and control system than its equivalent on the ground.

A system is provided for concentrating solar radiation onto an object at an arbitrary orbital location. The said system includes a focusing system, a target debris object tracking system, and a beam pointing and lens positioning system. The focusing system has a total focal length $f_T$, and includes two focusing elements, each of which can change from a pre-deployed (stowed) compact state, within a very small volume, to a deployed state of very large area in the same manner for each. The first focusing element has a positive focal length, $f_1$ when fully deployed and the second focusing element has a negative focal length, $f_2$ (equal but opposite in polarity to $f_1$) when fully deployed. Both elements share a common principal optical axis when deployed. Conventional Fresnel (amplitude or phase) elements are separated by a distance d when fully deployed where d is adjusted by linear actuators by the positioning system to vary the focal distance. This effective focal distance is:

$$f = \frac{f_1 f_2}{f_1 + f_2 - d}$$

which represents the effective operating range for the system. For two focusing elements of 100 m diameter and f/#=10, the focal lengths are $f_1=10^3$ m and $f_2=-10^3$ m. A separation, d varying between 10 and 100 meters varies the effecting working distance from 100 to 10 km. For larger apertures, e.g., $10^3$ m, the corresponding operating range is $10^4$ to $10^3$ km assuming the same f/# (a design constraint). Since longer ranges are undersirable from a system point-of-view (more diffraction loss and tighter pointing requirements), it is better to use the smaller apertures (100 meters), but to enable greater solar flux concentration, the 100 meter size can be replicated and the entire Fresnel array pattern used with piston position control. For the smaller (100 meter) size single element, a rotational focus control method can be used.

The object tracking system can determine the location of the object using conventional imagers for angular position tracking and laser (or microwave) radar for range tracking. The positioning system is adjusted based-on inputs from the tracking system and sun sensors. The targeted debris object must be monitored to derive focal spot size, brightness and temperature to optimize the transfer of solar energy to the debris object and monitor the disintegration process.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

The accompanying drawings, which are incorporated herein and form a part of the specification, illustrate an exemplary embodiment of the present invention and, together with the description, serve to explain the principles of the invention. In the drawings.

DETAILED DESCRIPTION

Figure 1A:
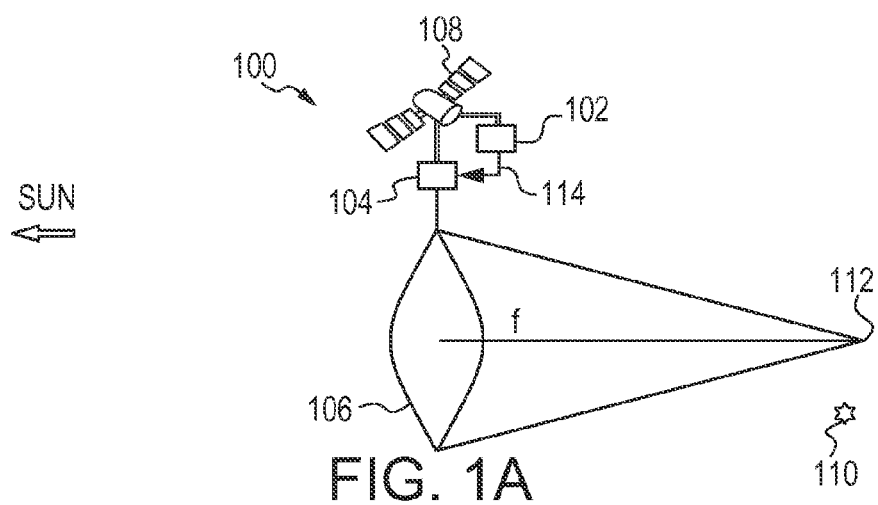
FIGS. 1A-1C illustrates a solar flux concentration system in operation in space in accordance with the present invention.

In accordance with one or more embodiments of the present invention, a system is provided for concentrating solar radiation onto an object at a location. For example, a space debris object is detected by the system. The system then acquires and tracks the targeted debris object and transmits concentrated solar radiation onto the space debris object to vaporize the space debris object.

The system includes a deployment mechanism, a focusing system, an object tracking system, a beam pointing, and a lens positioning control system. For example, the focusing system may be any deployable system that can focus solar radiation. Non-limiting examples of focusing systems include deployable Fresnel membrane lenses, deployable binary diffraction membrane gratings, deployable membrane pinhole arrays, and deployable membrane photon sieves.

The object tracking system may be any tracking system that can detect and track an object of interest. Non-limiting examples of object tracking systems include laser imaging tracking systems, optical tracking systems, and radar tracking systems. One example of an object tracking system consists of three subsystems: 1. An inertial reference assembly, which measures platform inertial attitude updated with periodic star tracker reference inputs, 2. A sun sensor that determines the direction of the sun with respect to the platform, and 3. An imaging tracker that can determine either the debris object location based on solar illumination or the same object given reflected laser illumination from a laser radar on-board the platform. Together these feed absolute angle location of the debris object to the platform attitude control system so that attitude control actuators (e.g., momentum wheels, cold gas thrusters, etc.) can slew the lens assembly platform with the object as it moves by the platform in a lower orbit. The other essential system required to successfully engage the target debris object is the focus control system which takes input from three subsystems: 1. A laser radar (or equivalent microwave radar) that measures the range to the debris object to establish the required focal distance, 2. An in situ wavefront sampler that measures the tip, tilt, curvature and relative alignment between the two lens elements comprising the solar flux focusing control system, and 3. In situ temperature sensors that determine the degree of solar loading on the lens membranes and structural elements to compensate for any asymmetric loading that could shift or defocus the focal spot at the debris object. The laser radar can also assist the platform/lens attitude control system by providing an alternate angle measurement of the debris object if the solar flux is too dim or bright to easily track in the panchromatic visible band. Finally, a remote temperature sensing capability is provided as an input to the target debris object monitoring system to help determine the effect on the object of the solar flux. Thus, images from the imaging tracker and remote temperature estimates of the focused spot help determine the spot size, intensity and temperature to determine the state of the debris object and any disintegration processes that it may be undergoing. It can also help determine the required adjustments to maintain the concentrated solar flux spot on the target debris object with sufficient duration to entirely disintegrate it.

The positioning system may be any positioning system that can controllably move a focusing system. Non-limiting examples of positioning systems include momentum wheels, cold gas jets, magnetic torquers, and electrodynamic positioning systems.

The focusing system has a total focal length $f_T$, and includes a first focusing device and a second focusing device. The first focusing device and second focusing device each may be any focusing devices that transmit concentrated solar radiation onto a location, but in combination are adjustable to focus the solar flux adaptively as range changes between the system and the target debris object. Non-limiting examples of focusing devices include Fresnel lenses, pinhole arrays, and photon sieves. Alternative means of adapting the focus is to adjust the distance between the positive and negative Fresnel (amplitude or phase patterned) lenses, or to adjust relative orientations of two phase-only Fresnel lenses with the appropriate phase pattern.

Both focusing elements can change from a compact state to a deployed state. Prior to deployment they have a very compact volume, and a first surface area, wherein the compact volume sufficient to be stowed within conventionally-sized launch vehicle volumes and have a very large deployed surface area when in deployed to maximize the captured solar flux. The compact surface area is less than the deployed surface area.

The first focusing element has a focal length $f_1$ in the deployed state. The second focusing element has a focal length $f_2$ in the deployed state. For effective total focal point (f) control only two types of elements are required: one with a positive and one with a negative focal length of equal and opposite value, in either order with respect to the source or target object.

When deployed, the focusing elements share an optical axis. The first focusing element is separated from the second focusing element by a distance d. The object tracking system can determine the location of the object and via the platform attitude control system orient the system to point at the target debris object and maximize the solar flux delivered to the debris object. The lens element positioning system adjusts the spacing of the elements to focus the solar flux at the correct debris object range.

Example embodiments in accordance with aspects of the present invention will now be described with reference to FIGS. 1A-9.

Figure 1B:
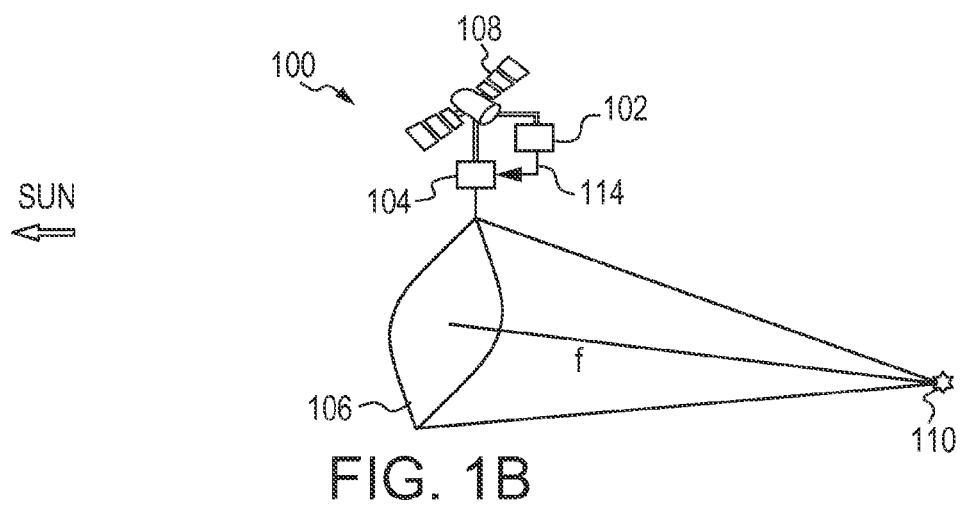
Figure 1C:
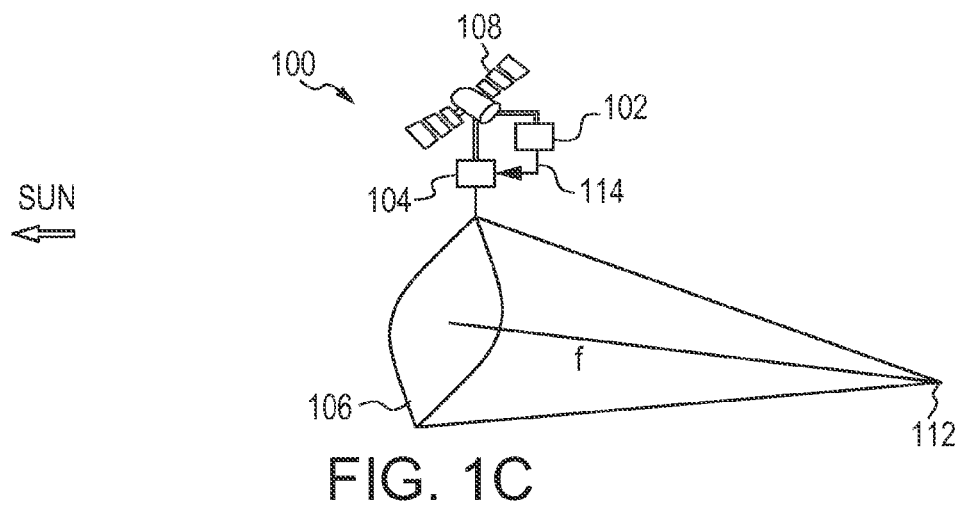

FIGS. 1A-1C illustrate operation of a solar flux concentration system 100, at times $t_0$, $t_1$ and $t_2$, respectively, in accordance with the present invention.

As shown in FIG. 1A, solar flux concentration system 100 includes an object tracking system 102, a lens positioning system to focus the solar flux 104 and a focusing system 106. Additionally shown in FIG. 1A includes a spacecraft 108, a space debris object 110, a focal point 112, a communication link 114, and the Sun shown to the left of solar flux concentration system 100.

As illustrated in FIG. 1A, at time $t_0$, solar flux concentration system 100 is first carried into space by spacecraft 108. Spacecraft 108 deploys solar flux concentration system 100 near space debris object 110 that is to be remediated. Space debris object 110 may be located at a position from spacecraft 108 that coincides with a focal length f of solar flux concentration system 100, as will be described later. In an example embodiment, space debris object 110 may be located 1 km to more than 10 km away from spacecraft 108. When solar flux concentration system 100 is deployed initially, Focusing system 106 has focal point 112, where solar radiation is focused. Focal point 112 is not on space debris object 110 at time $t_0$. object tracking system 102 identifies and tracks the location of space debris object 110.

As illustrated in FIG. 1B, at time $t_1$, object tracking system 102 transmits the location information of space debris object 110 to positioning system 104 via communication link, positioning system 104 repositions focusing system 108 so that focal point 112 is on space debris object 110. The continuous heating from focused solar radiation transmitted by focusing system 108 through focal point 112 vaporize space debris object 110.

As illustrated in FIG. 1C, at time $t_2$, space debris object 110 (not shown in the figure) is vaporized due to continuous heating from focused solar radiation transmitted by focusing system 108 through focal point 112. Once space debris object 110 is vaporized, solar flux concentration system 100 will search for new space debris objects to remediate through object tracking system 102.

Figure 2:
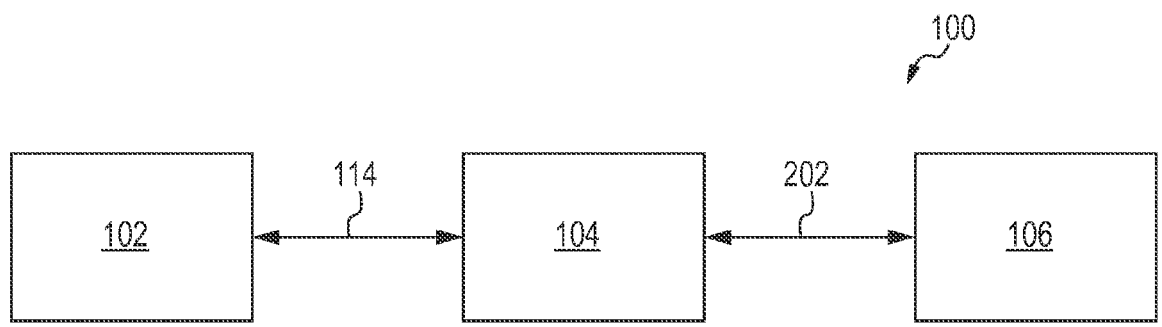
FIG. 2 is a block diagram showing various subsystems of the solar flux concentration system of FIGS. 1A-1C.

FIG. 2 is a block diagram showing various subsystems of solar flux concentration system 100 as shown in FIGS. 1A-1C.

As illustrated in FIG. 2, solar flux concentration system 100 includes object tracking system 102, positioning system 104, and focusing system 106.

Object tracking system 102 is arranged to identify and track the location of space debris object 110. Positioning system 104 is arranged to reposition focusing system 106. Focusing system 106 is arranged to focus solar radiation onto space debris object 110. Object tracking system 102 is in communication with positioning system 104 via communication link 114. Positioning system 104 is in communication with focusing system 106 via communication 202.

In a non-limiting example embodiment, space debris object 110 may be a Category 2 space debris object. Object tracking system 102 may be any object tracking system used for identifying and tracking the movement of an object. Object tracking system 102 should have the ability to track objects down to Category 2 size at a distances of 10 kilometers or more.

Object tracking systems are well-known, non-limiting examples include laser imaging tracking systems, optical tracking systems, and radar tracking systems. In a non-limiting example embodiment, object tracking system 102 may be a co-boresighted integrated laser tracker that has line-of-sight rates within the laser tracker pointing bandwidth.

Positioning system 104 may be any positioning systems used for controllably moving a focusing system. Positioning system 104 should have attitude control authority for a very large but low mass structure. Furthermore, positioning system 104 should select an orbital path with respect to solar phase to induce greatest line-of-sight rate effect, thus optimizing solar radiation focus during remediation.

Positioning systems are well-known, non-limiting examples of positioning systems include momentum wheels, cold gas jets, magnetic torquers (against the local ambient field) and electrodynamics positioning systems.

Communication links 114 and 202 may be any communication media used for transmitting signals. Non-limiting examples of communication links include radio frequency links, optical links, wired links and wired links.

Focusing system 108 transmits focused solar radiation onto a targeted space debris object at focal point 112 for vaporization. Focusing system 108 should vaporize a targeted space debris object within a limited exposure time.

As solar radiation has a large range of wavelengths, a general focal length desired to be focused depends on the design spectrum chosen.

As illustrated in FIG. 1A, focusing system 108 is shown to be focusing solar radiation at focal point 112. As one skilled in the art can appreciate, there are many possible focal points associated with the different wavelengths of solar radiation. Thus, depending on the design parameter of solar flux concentration system 100, one skilled in the art will be able to recognize/calculate the focal point for a predetermined wavelength of light. Clearly, any material may be used depending on the design parameter chosen.

Also illustrated in FIG. 1A, a single focal point, focal point 112, is shown for purpose of brevity. As one skilled in the art can appreciate, a focal volume or zone is also possible. As long as focusing system 108 is large enough to collect enough solar radiation, focal point 112 will be able to vaporize space debris object 110.

In operation, object tracking system 102 identifies and tracks the location of space debris object 110. Object tracking system 102 then provides the location data to positioning system 104 via communication link 114. In a non-limiting example embodiment, focusing system 106 provides its current position data to positioning system 104 via communication link 202. In another non-limiting example embodiment, positioning system 104 maintains the current position data of focusing system 106 as focusing system 106 does not keep track of its current position.

Based on the space debris object location data and the current position data of focusing system 106, positioning system 104 changes the position of focusing system 106 to focus solar radiation onto the targeted space debris object for remediation.

When deployed, focusing system 106 has a large surface area so that there is enough focused solar radiation to vaporize Category 2 space debris objects. For example, focusing system 106 may have an optical structure that is at least 100 meters in diameter.

For such a large aperture diameter, conventional focusing systems would have been impractical to deploy. Glass lenses have an areal density of over 100 kg/m$^2$, making the payload extremely heavy. Furthermore, conventional focusing systems would have difficulty fitting into any known spacecraft and would risk damage from shocks during launching.

Unlike conventional focusing systems, focusing system 106 utilizes collapsible membrane optics so that it has a compact payload size when not deployed and be light-weight. Thus, making deployment in space practical. This will be further described with additional reference in FIGS. 3-7 below.

Figure 3:
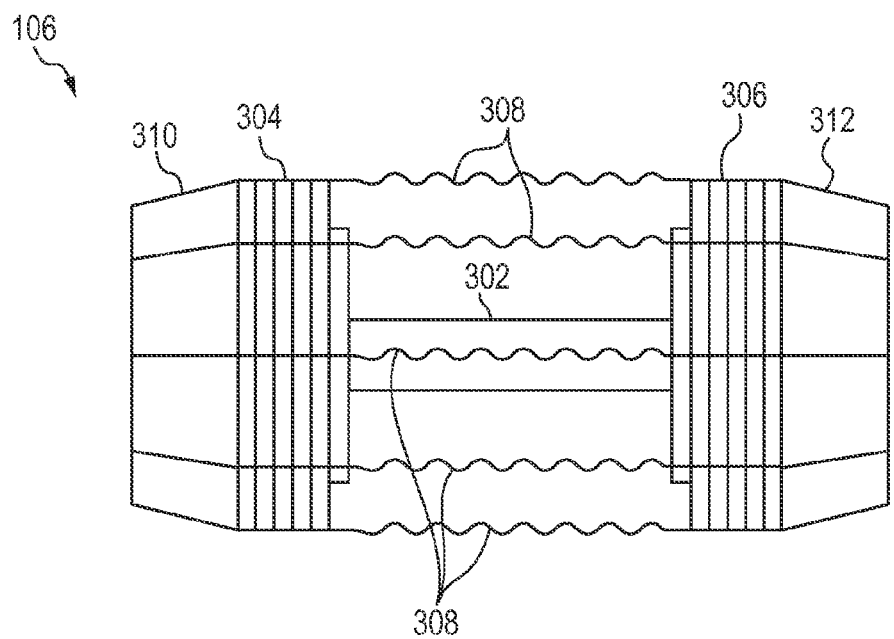
FIG. 3 is a side view of a focusing system of the solar flux concentration system of FIG. 2 prior to deployment.

FIG. 3 is a side view of focusing system 106 of solar flux concentration system 100 as shown in FIG. 2 in a compact state prior to deployment.

Focusing system 106 includes an extensible piston 302, a first focusing device 304, a second focusing device 306, alloy/thin high tensile strength wires 308, a first back support 310, and a second back support 312. Extensible piston 302 includes a first telescoping portion 314, a first wire support 316, a first set of guy-wire assembly 318, a second telescoping portion 320, a second wire support 322 and a second set of guy-wire assembly 324.

Extensible piston 302 is arranged to provide structure support for first focusing device 304 and second focusing device 306. First focusing device 304 and second focusing device 306 are arranged to provide concentrated solar radiation at a point in space. First telescoping portion 314, first wire support 316, first set of guy-wire 318, second telescoping portion 320, second wire support 322, and second set of guy-wire 324 are arranged to precisely align first focusing device 304 and second focusing device 306.

In a non-limiting example embodiment, extensible piston 302 may be any automatic extensible device or structures used in space. First focusing device 304 may be a membrane optic with a positive focal length (f1), non-limiting examples of which include a Fresnel lens, a pinhole array, a fractal photon sieve. Second focusing device 306 may be a membrane optic with a negative focal length (f2), non-limiting examples of which include a Fresnel lens, a pinhole array, a fractal photon sieve.

As one skilled in the art can appreciate, while photon sieves will likely be the easiest to fabricate and to accommodate a full solar spectrum, more solar flux will be absorbed, thus expanding the scale of the lens and, if asymmetrical, warping the lens. The use of phase-only mode will absorb less solar flux, but will be harder to make broadband, thus requiring multiple layers.

The use of membrane optics allow for first focusing device 304 and second focusing device 306 to be light-weight, thus reducing the associated payload requirements. As a comparison, membrane optics have areal densities of only 0.4-1 kg/m$^2$, silicon carbide (SiC) and beryllium, which are the lowest areal density state-of-the-art materials currently used routinely in space, have areal densities of 10-35 kg/m$^2$.

First wire support 316 and second wire support 322 may be any wire supports for retaining guy-wires used in space. First set of guy-wire 318 and second set of guy-wire 324 may be any guy-wires used in space.

Focusing system 106 is launched, prior to deployment, in a compact configuration to reduce the payload size. First telescoping portion 314, first wire support 316, second telescoping portion 320, and second wire support 322 all rest within extensible piston 302 to reduce payload size. First focusing device 304 and second focusing device 306 are wrapped around extensible piston 302. This compact configuration also protects focusing system 106 from shocks associated with launching.

Once in space, focusing system 106 will transform into an operational configuration. This will be further described with additional reference in FIGS. 4-7 below.

Figure 4:
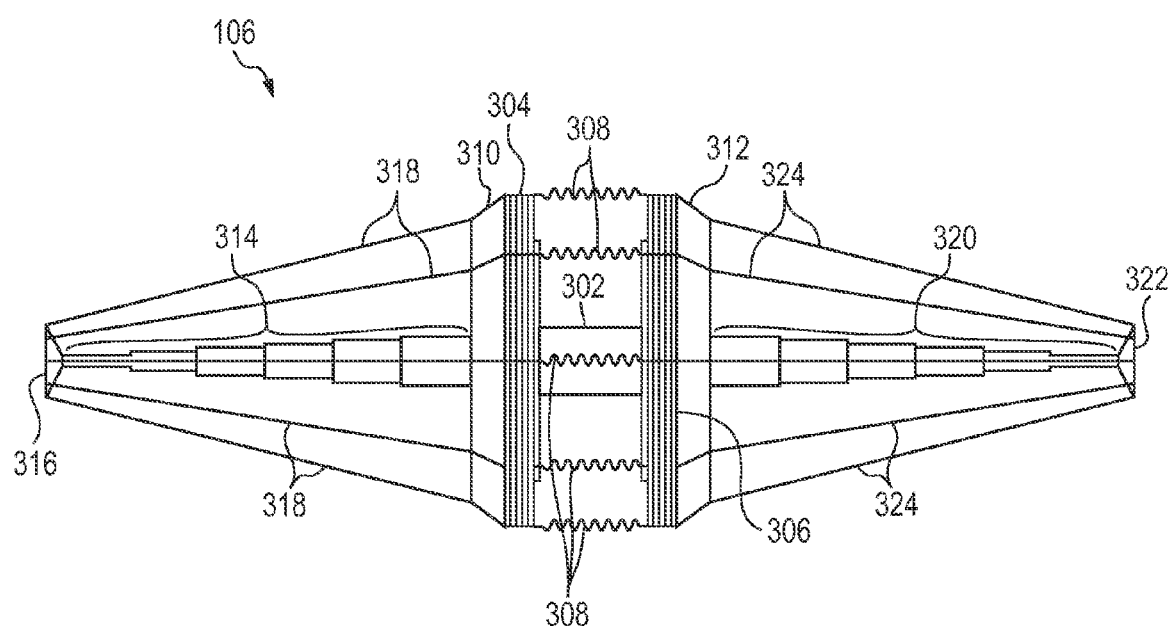
FIG. 4 is a side view of the focusing system of FIG. 3 during deployment.

FIG. 4 is a side view of focusing system 106 during deployment.

When initially deployed, first telescoping portion 314 and second telescoping portion 316 extend forward and away from extensible piston 302 for a predetermined distance, thus tensioning first set of guy-wire 318 and second set of guy-wire 324. First set of guy-wire 318 is pre-tied between first wire support 316 and first focusing device 304. Second set of guy-wire 324 is pre-tied between first wire support 322 and first focusing device 306.

Once first telescoping portion 314 and second telescoping portion 316 finished deploying, first focusing device 304 and second focusing device 306 will deploy next. This will be further described in FIGS. 5-6 below.

Figure 5:
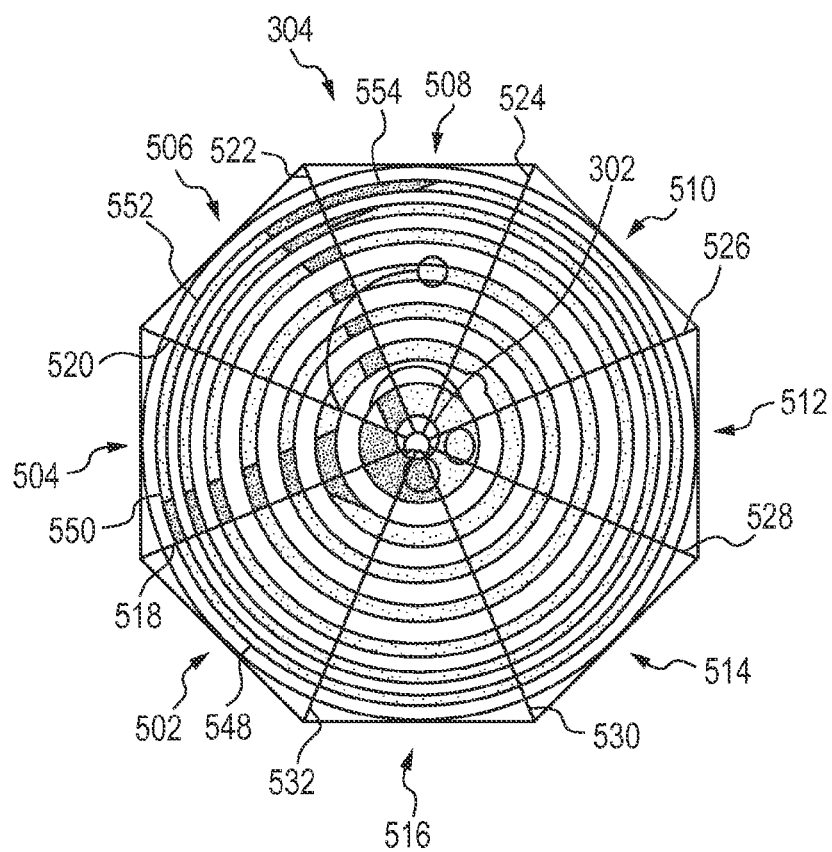
FIG. 5 is a top view of a fully deployed focusing device of the focusing system of FIG. 4.

FIG. 5 is a top view of first focusing device 304 fully deployed.

First focusing device 304 includes first membrane segment 502, second membrane segment 504, third membrane segment 506, fourth membrane segment 608, fifth membrane segment 510, sixth membrane segment 512, seventh membrane segment 514, and eighth membrane segment 516.

Each membrane segment 502, 504, 506, 508, 510, 512, 514, 516 is in an isosceles shape and includes longeron 518, 520, 522, 524, 526, 528, 530, 532 and membrane optic segment 534, 536, 538, 540, 542, 544, 546, 548 respectively. In a non-limiting example embodiment, each membrane segment 502, 504, 506, 508, 510, 512, 514, 516 may also include integrated solar cells for providing practically unlimited power to solar flux concentration system 100.

In a non-limiting example embodiment, longerons 518, 520, 522, 524, 526, 528, 530, 532 may be any collapsible structures used for providing structure support in space. Longerons 518, 520, 522, 524, 526, 528, 530, 532 should be made very rigid and highly damped when deployed.

Non-limiting examples of longerons includes double-walled longerons and extended length longerons. Membrane segments 502, 504, 506, 508, 510, 512, 514, 516 may be any lens segments of a Fresnel lens, a pinhole array, or a fractal photon sieve.

Second focusing device 306 (not shown in the figure) is constructed in an identical fashion to first focusing device 304.

When fully deployed, first focusing device 304 and second focusing device 306 have a large surface area respectively so that enough solar radiation can be focused on to space debris objects for remediation. First focusing device 304 and second focusing device 306 must be launched in a compact state and transition into the fully deployed state once in orbit. The transition from a compact state to a fully deployed state will be further described in FIG. 6 below.

Figure 6:
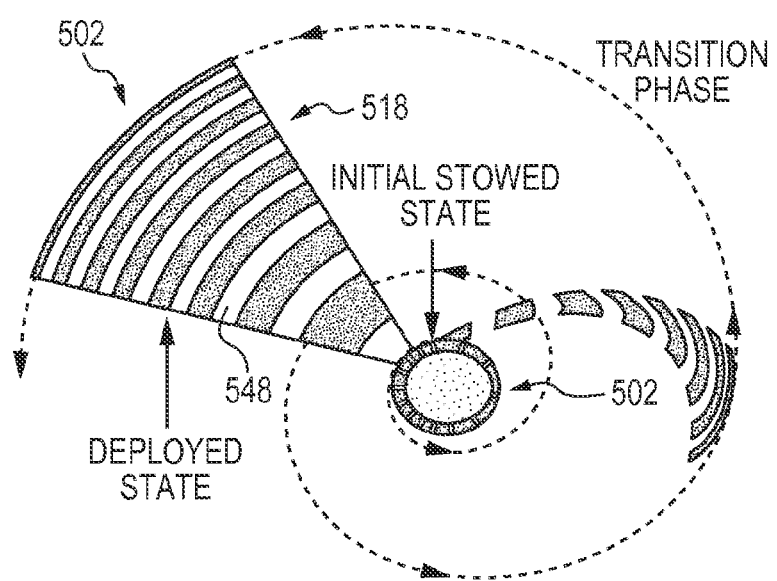
FIG. 6 illustrates a deployment sequence of one petal (⅛ sector) of the first or second focusing device of FIG. 5.

FIG. 6 illustrates a deployment sequence of membrane segment 502.

Prior to deployment, membrane segment 502 is wrapped around extensible piston 302 in a compact configuration to reduce payload size. Similarly, membrane segments (not shown in FIG. 6) 504, 506, 508, 510, 512, 514, 516 are also wrapped around extensible piston 302 in a compact, staggered configuration. Membrane segments 502, 504, 506, 508, 510, 512, 514, 516 are wrapped around extensible piston 302 with sufficient compression force that they will each unfold by itself without an external force. As a result, first focusing device 304 has a surface area a1 in the compact state.

When transitioning to the fully deployed state, first telescoping portion 314 first extends forward and away from extensible piston 302 to a predetermined distance as shown in FIG. 4. This tensions first set of guy-wire 318, which is pre-tied to membrane segments 502, 504, 506, 508, 510, 512, 514, 516. The tensioning of first set of guy-wire 318 causes membrane segments 502, 504, 506, 508, 510, 512, 514, 516 to each unfold in a spiral pattern to a fully deployed state.

First set of guy-wires 318 and second set of guy-wire 324 should be payed-out to allow longerons 518, 520, 522, 524, 526, 528, 530, 532 to fully release their stored elastic energy and retract as thermal loading varies or to correct for misalignments.

When fully deployed, each membrane segment 502, 504, 506, 508, 510, 512, 514, 516 combines to construct a circular membrane optic due to the initial staggered configuration. As a result, first focusing device 304 has a greater surface area a2 in a fully deployed state.

Second focusing device 306 is deployed in an identical fashion. Thus, second focusing device 306 also has a substantially larger surface area than its compact state.

In another non-limiting example embodiment, first focusing device 304 and second focusing device 306 may be membrane lens contained in separate inflatable structures. Prior to deployment, first focusing device 304 and second focusing device 306 are folded in a compact package. In deployment, first focusing device 304 and second focusing device 306 are inflated into a spherical, cylindrical, or prism shape. Suitable chemical treatment and coatings (e.g. ceramic foam) may be used to provide rigid structure support for first focusing device 304 and second focusing device 306.

In a further non-limiting example embodiment, first focusing device 304 and second focusing device 306 may be membrane lenses contained in separate inflatable structures with integrated solar cells for providing practically unlimited power solar flux concentration system 100.

Figure 7:
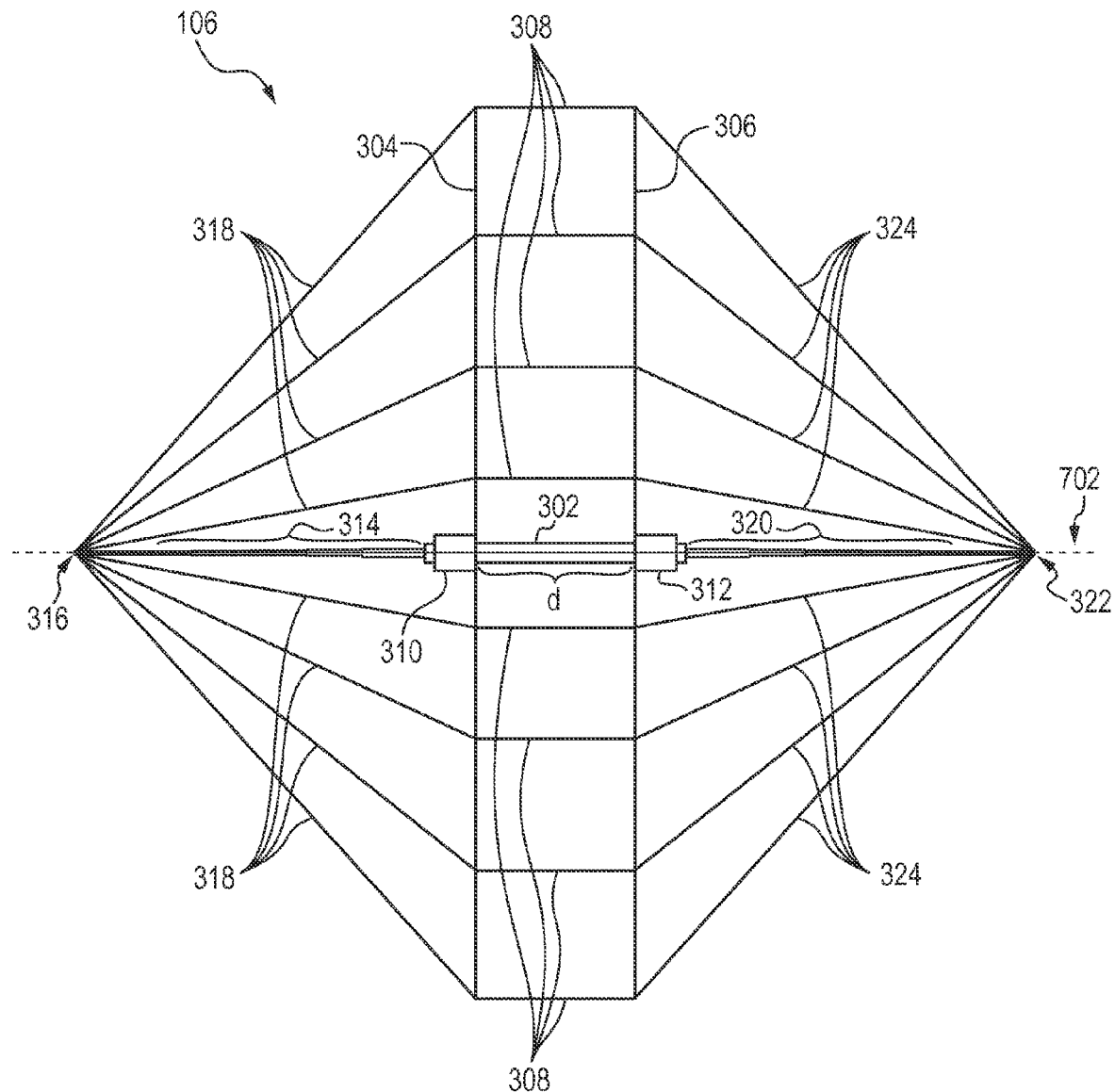
FIG. 7 is a side view of the focusing system of FIG. 3 fully deployed.

FIG. 7 is a side view of fully deployed focusing system 106.

When fully deployed, first focusing device 304 and second focusing device 306 share an optic axis 702. First focusing device 304 and second focusing device 306 is separated by a distance d equal to the length of extensible piston 302. Thus, the combined focal length (f) of first focusing device 304 and second focusing device 306 is $f=(f1*f2)/(f1+f2-d)$. First set of guy-wire 318 and second set of guy-wire 324 provide structural support for first focusing device 304 and second focusing device 306 respectively. First set of guy-wire 318 and second set of guy-wire 324 also help to correct misalignments and thermal distortion of first focusing device 304 and second focusing device 306 respectively.

Based on the location of a targeted space debris object, focus control over several kilometers can be achieved to focus solar radiation onto the targeted space debris object by adjusting the combined focal length f. The focal length f is dependent on many factors, one of which is the curvature of the lens. In a non-limiting example embodiment, the curvature of first focusing device 304 or second focusing device 306 may be changed by slightly adjusting the tensioning of first set of guy-wires 318 and second set of guy-wires 324 respectively.

In another non-limiting example embodiment, the combined focal length f can be changed by adjusting distance d through extensible piston 302.

In a further non-limiting example embodiment, rotating either first focusing device 304 or second focusing device 306 can adjust the combined focal length f.

As noted in FIGS. 3-7, focusing system 106 is carried into space in a compact state to reduce payload size by wrapping first focusing device 304 and second focusing device 306 around extensible piston 302. Additionally, first telescoping portion 314 and second telescoping portion 320 are retracted into extensible piston 302 to further reduce payload size. First focusing device 304 and second focusing device 306 utilize membrane optics to reduce payload mass. First set of guy-wire 318 and second set of guy-wire 324 transform first focusing device 304 and second focusing device 306 from a compact state to a fully deployed state.

When fully deployed, object tracking system 102 identifies and tracks a targeted space debris object. Object tracking system 102 provides the location data of the targeted space debris object to positioning system 104. Based on data from object tracking system 102 and the current position of focusing system 106, positioning system 104 then aligns focusing system 106 to focus solar radiation onto the targeted space debris object.

FIG. 8 is a block diagram showing various subsystems of an example solar flux concentration system 800, in accordance with aspects of the present invention As illustrated in the figure, system 800 includes a subsystems portion 802, a control logic portion 804, a control actuators portion 806 and an end state portion 808.

As illustrated in the figure, subsystems portion 802, control logic portion 804, control actuators portion 806 and the end state achieved 808 are illustrated as distinct devices/functions. However, at least two of subsystems portion 802, the control logic portion 804, and control actuators portion 806 may be combined as a unitary device. Further, in some embodiments at least one of subsystems portion 802, the control logic portion 804 may be implemented as tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a tangible computer-readable medium. Thus, any such connection is properly termed a tangible computer-readable medium. Combinations of the above should also be included within the scope of tangible computer-readable media.

Subsystems portion 802 includes an inertial reference assembly portion 810, a sun sensor portion 812, an image tracker portion 814, a laser radar portion 816, a wavefront sampler 818, an in-situ temperature sensor portion 820 and a remote temperature sensing portion 822. As illustrated in the figure, inertial reference assembly portion 810, sun sensor portion 812, image tracker portion 814, laser radar portion 816, wavefront sampler 818 in-situ temperature sensor portion 820 and remote temperature sensing portion 822 are illustrated as distinct devices. However, at least two of inertial reference assembly portion 810, sun sensor portion 812, image tracker portion 814, laser radar portion 816, wavefront sampler 818, in-situ temperature sensor portion 820 and remote temperature sensing portion 822 may be combined as a unitary device. Further, in some embodiments at least one of inertial reference assembly portion 810, sun sensor portion 812, image tracker portion 814, laser radar portion 816, wavefront sampler 818, in-situ temperature sensor portion 820 and remote temperature sensing portion 822 may be implemented as tangible computer-readable media for carrying or having computer-executable instructions or data structures stored thereon.

Control logic portion 804 includes an attitude control portion 824 and a focus control portion 826. As illustrated in the figure, attitude control portion 824 and focus control portion 826 are illustrated as distinct devices. However, attitude control portion 824 and focus control portion 826 may be combined as a unitary device. Further, in some embodiments at least one of attitude control portion 824 and a focus control portion 826 may be implemented as tangible computer-readable media for carrying or having computer-executable instructions or data structures stored thereon.

Control actuators portion 806 includes platform attitude control actuators portion 828 and a lens assembly linear and angular actuators portion 830. As illustrated in the figure, platform attitude control actuators portion 828 and lens assembly linear and angular actuators portion 830 are illustrated as distinct devices. However, platform attitude control actuators portion 828 and lens assembly linear and angular actuators portion 830 may be combined as a unitary device. Further, in some embodiments at least one of platform attitude control actuators portion 828 and a lens assembly linear and angular actuators portion 830 may be implemented as tangible computer-readable media for carrying or having computer-executable instructions or data structures stored thereon.

Inertial reference assembly portion 810 provides attitude with respect to nominal (body-centered) inertial coordinates of the platform. Sun sensor portion 812 gives the angular location of the sun with respect to the sensor line-of-sight on the platform. Image tracker portion 814 measures the dynamic (time-varying) angular location of the debris object with respect to its sensor line-of-sight. Laser radar portion 816 can provide an alternative measure of the debris angular location in lieu of solar illuminated object, if required.

Together, these are passed to control logic portion 804, inputs are converted into commands for the platform to be slewed by platform attitude control actuators portion 824 to maintain a solar flux focal spot on the debris object. Focus control portion 826 receives measurements of range from laser radar portion 816, which permits commands to be executed to change the relative spacing of the two lens elements to maintain a minimal focal spot on the debris object via lens assembly linear and angular actuators portion 830 (either linear, angular or both, depending on the type of membrane lens amplitude and phase modulation profile).

To refine the focus of the system, additional measurements are made and input into focus control portion 826. These include a sampling of both lens membranes as several strategic points using Shack-Hartmann type wavefront samplers in wavefront sampler 818 embedded in each membrane and illuminated with either surface emitting light emitting diodes (LEDs) or laser diodes as well as monitoring such reflected beams from specific points on each membrane and measuring the degree of deflection using in situ CMOS sensors. In addition, local in situ temperatures are monitored via in situ temperature sensor portion 820 on the membrane and structural elements (along radial longeron spars and around peripheral boundaries) to determine the degree of solar loading and how asymmetric it is in order to compensate via guy-wire bias on the longeron radial spars for each octal segment of a given lens element. Finally, sensing of the debris object's temperature via remote temperature sensing portion 822, can be accomplished by either infrared imaging or remote pyrometery. Thus, attitude and focus commands as well as estimated debris temperatures are input into a final state estimate of the location, spot size, and duration of the solar flux at the debris object in order to assist compensation and determine the limit for maintaining track and the disintegration process. The extent of the disintegration process is also monitored by imagery from the imaging tracker.

Additional controls enable measurement and actuation of the lens elements in terms of their relative spacing (d), and relative rotation angle ( ) about their shared optical axis. Bidirectional linear actuators comprised of flexible high-tensile strength wires can be used to control large changes in relative separation. Rotary actuators at the base of each central spar control their relative rotation angle. This latter function is useful for large angular shifts for modulating the focal distance when the lens elements look like those shown in the figure, which are phase-only elements. Small angular shifts are useful when using two Fresnel lens elements (amplitude or phase-only) comprised of arrays to enable very small angular deviations for beam control. A small amount of curvature control can be accomplished by applying an electrostatic field between each octal segment of each corresponding lens element using transparent conductive coatings on each of their segments, for instance indium tin oxide (ITO). This permits another degree of freedom in fine tuning the spot location and size.

In accordance with another aspect of the present invention, membrane surfaces intended as light collectors or focusing elements may be replicated into an array of sub-elements. Such sub-elements may perform similar to a much larger the large Fresnel zone provided they maintain alignment, channelize, and focus light as the distance is varied between two such arrays. Flexible membranes can also support thin film electronics such as optical tracking circuits, solar cell arrays, and focal planes. Accordingly, flexible membranes may be embedded into the appropriate surfaces to support these functions. Further, the relative surface distortions of each membrane may be monitored to support their compensation using so-called Shack-Hartmann devices.

Solar flux concentration system 100 ensures that focusing system 106 is lightweight and has a small payload size prior to deployment by virtue of collapsible membrane optics. The integrated solar cells on the membrane optics or inflatable structures provides practically unlimited power for Solar flux concentration system 100, thus eliminating the need to carry additional power source to further reduce payload mass. Object tracking system 102 allows for space debris objects tracking, while positioning system 104 provides precise focus control.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A system for concentrating solar radiation onto an object at a location, said system comprising:

a focusing system having a total focal length $f_T$, said focusing system including a first focusing device and a second focusing device, said first focusing device being operable to change from a first compact state to a first deployed state, said first focusing device having a first compact surface area when in the first compact state, said first focusing device having a first deployed surface area when in the first deployed state, the first compact surface area being less than the first deployed surface area, said second focusing device being operable to change from a second compact state to a second deployed state, said second focusing device having a second compact surface area when in the second compact state, said second focusing device having a second deployed surface area when in the second deployed state, the second compact surface area being less than the second deployed surface area, said first focusing device having a first focal length $f_1$ in the first deployed state, said second focusing device having a second focal length $f_2$ in the second deployed state, said first focusing device in the first deployed state sharing an optic axis with said second focusing device in the second deployed state, said first focusing device in the first deployed state being separated from said second focusing device in the second deployed state by a distance d, the focusing system further including an extensible piston having a proximal end connected to one of the first and second focusing devices and a distal end extending outward from one of the first and second focusing devices, and guy wires connected between the distal end and one of the first and second focusing devices to control one or both of a shape and a position of one of the first and second focusing devices;

an object tracking system operable to determine the location; and a positioning system operable to position said focusing system such that solar radiation focuses at the location.

2. The system of claim 1, wherein said first focusing device comprises a Fresnel lens.

3. The system of claim 1, wherein said first focusing device comprises a pinhole array.

4. The system of claim 1, wherein said first focusing device comprises a fractal photon sieve.

5. The system of claim 1, wherein said first focusing device comprises a plurality of isosceles panels.

6. The system of claim 1, wherein the first focal length $f_1$ is a positive focal length, and the second focal length $f_2$ is a negative focal length relative to the first focal length.

7. The system of claim 1, wherein the positioning system is configured to vary a distance, d, between the first focusing device and the second focusing device to focus the solar radiation at the location.

8. The system of claim 7, wherein the positioning system is configured to focus the solar radiation at the location according to the equation:

$$f = \frac{f_1 f_2}{f_1 + f_2 - d},$$

wherein f is a distance between the focusing system and the location.

9. The system of claim 1, wherein the first and second focusing devices comprise membrane materials, and the focusing system is configured to have the membrane materials wrapped around the extensible piston in first compact state, and to have the membrane materials unwrapped from the extensible position in the first deployed state.

10. The system of claim 1, wherein the first and second focusing devices are inflatable membrane lenses, and the focusing system is configured such that the first and second focusing devices are deflated in the first and second compact states, and the first and second focusing devices are inflated in the first and second deployed states.

11. The system of claim 10, wherein the first and second focusing devices include solar cells for providing power to the system for concentrating solar radiation onto an object at said location.

12. The system of claim 1, wherein the positioning system is configured to adjust a curvature of one of the first and second focusing devices by adjusting tension on the guy wires.

13. The system of claim 1, wherein the positioning system is configured to adjust a combined focal length of the first and second focusing devices by adjusting tension on the guy wires.

14. The system of claim 1, wherein the positioning system is configured to adjust a combined focal length of the first and second focusing devices by rotating one or both of the first and second focusing devices.

* * * * *